April 8, 1952  S. E. ULLMANN  2,592,494
SEAL
Filed July 12, 1947
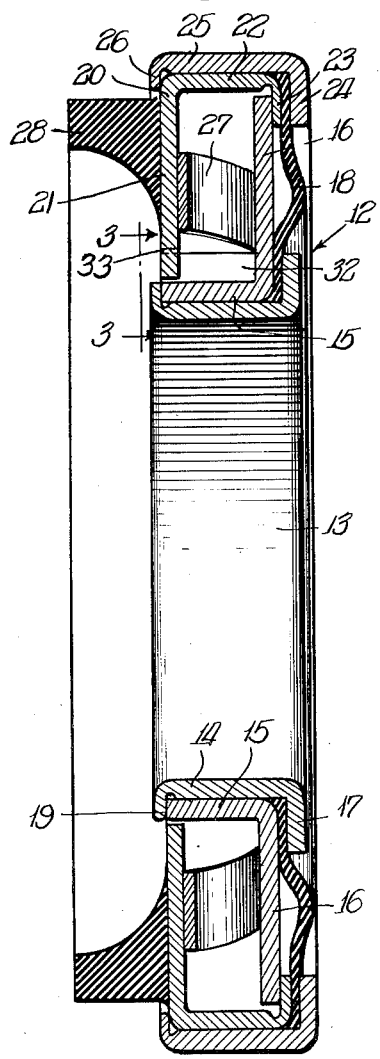
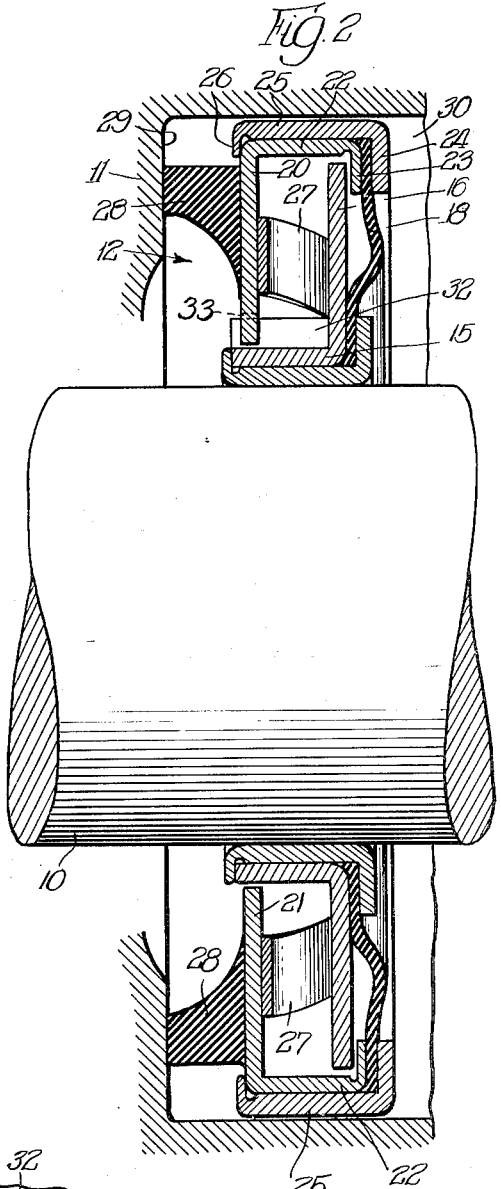
INVENTOR.
Stuart E. Ullmann,
BY
Cromwell, Greist & Warden Patented Apr. 8, 1952

2,592,494

UNITED STATES PATENT OFFICE 2,592,494

SEAL

Stuart E. Ullmann, Lake Bluff, Ill., assignor to Chicago Rawhide Manufacturing Company, Chicago, Ill., a corporation of Illinois Application July 12, 1947, Serial No. 760,557

2 Claims. (Cl. 288—3)

This invention pertains to improvements in a shaft or like seal adapted for association with a pair of relatively rotatable parts to prevent entry of dirt and foreign matter therebetween, as well as to seal the same against fluid loss.

It is an object of the invention to provide a seal of the foregoing character which is entirely self-contained and unitary in nature, including certain stamped sheet metal casing parts supporting a dirt and fluid sealing diaphragm and a sealing nose in a novel manner, said parts likewise coacting with one another to limit relative axial movement thereof.

A more specific object is to provide a novel seal of the type described including an assembly of coacting inner and outer shells having a rearwardly disposed radial sealing diaphragm clamped therebetween, said shells being adapted for relative axial movement against the action of an internal spring and being keyed against relative rotative movement, in which assembly one of the shells carries an axially directed face sealing nose on the opposite axial side of the assembly from said diaphragm, and the diaphragm serves to protect the interior of the assembly against entry of dirt and foreign matter from the exposed rear side thereof.

Yet another specific object is to provide a seal of the foregoing description in which the shell or casing members of the assembly have novel provisions for abutting one another to limit axial movement and also have novel provisions for limiting relative rotation thereof.

Other and more specific objects and advantages will be apparent to those skilled in the art upon a full understanding of the structure and operation of the seal. A single embodiment of the invention is presented herein by way of illustration, but it will be appreciated that the invention is susceptible of incorporation in still other modified forms coming equally within the scope of the appended claims.

In the drawings:

Fig. 1 is an enlarged view in longitudinal section along the axis of a seal in accordance with the invention, showing the same in relaxed normal condition prior to installation;

Fig. 2 is a fragmentary view in section similar to Fig. 1 illustrating the seal in its operative, set up condition in association with a pair of relatively rotatable parts to be sealed; and Fig. 3 is an enlarged fragmentary view, approximately along the line 3—3 of Fig. 1, illustrating a detail of the locking means whereby relative rotation of certain elements of the seal is restrained.

The present invention affords an improved shaft or like seal of a very compact and unitary or self-contained nature, adapted to prevent entry of dust and foreign matter from the outer, exposed axial side thereof, as well as to provide a very effective, leak proof fluid seal against a relatively rotatable surface on the opposite side of the seal. The improvements primarily reside in the simplicity of construction and assembly of certain coacting casing elements of the seal, and in the fact that an internally housed spring which is employed to urge said elements in opposite axial directions is entirely encased within the same, being rearwardly protected by a flexible radial diaphragm clamped between said elements from exposure to dirt and foreign matter such as would impair its operation. A further advantage resides in the novel cooperation of said casing elements to prevent axial separation under the action of said spring, whereby a unitary self-contained seal is produced, all in the manner hereinafter described in detail.

Referring to the drawings, in Figs. 1 and 2 the seal is shown respectively in a relaxed condition prior to installation and in an operably installed relation to a pair of relatively rotatable parts, such, for example, as a shaft 10 and housing 11 therefor.

The seal itself is generally designated by the reference numeral 12 and comprises an inner, annular, axially extending casing element 13 of shaped sheet metal which is adapted to be secured on the shaft 10, as by a force fit. The axial sleeve portion 14 of member 13 externally receives with a telescoping fit the corresponding axial sleeve portion 15 of a further inner, annular casing element of L-shaped section. These sleeve portions have integral, annular, radially extending flanges 16, 17 which coact to clamp the inner periphery of the flexible, radially extending, centrally apertured diaphragm 18 therebetween. Flange 16 is of substantial radial width.

Diaphragm 18 may be fabricated of any desired fluid and dirt impervious, resilient or flexible sealing material such as leather or similar material or composition, synthetic or natural rubber, or the like. The internal axial sleeve portion 15 is rigidly secured so as to hold its flange 16 in proper clamping relation to the diaphragm by spinning an annular lip 19 on the inner sleeve portion 14 around the end of portion 15, as indicated. So assembled, the parts define a composite inner casing member which is generally of L-shaped cross-section.

A composite casing member of a somewhat similar character serves to clamp the outer periphery of the radial diaphragm. This casing member comprises an annular inner element 20 of L-shaped cross section including an inwardly extending flange 21 of substantial radial width, spaced axially from flange 16, and an axially extending sleeve portion 22. Portion 22 is provided with an inwardly spun annular stop shoulder or lip 23 which coacts with an inwardly directed radial flange 24 on the outer, sleeve like casing element 25 in clamping the outer periphery of the diaphragm 18. The parts of the composite outer casing member are held in the diaphragm clamping relation by spinning an annular lip 26 on element 25 inwardly into clamping relation to the adjacent corner of the L-shaped element 20, as indicated.

Thus the seal embodies coacting inner and outer casing members of generally similar, L-shaped sectional outline which define a hollow axially collapsible annular shell of box-like cross section, along with a radial sealing diaphragm paralleling one of the axial sides of the shell and secured at its inner peripheries to corresponding axial sides of the constituent members thereof.

An annular thrust spring 27 of a conventional waved or undulatory outline is disposed concentrically within the above described shell, engaging the flanges 16 and 21 of the respective casing members at its opposite axial sides. Accordingly, in the normal relaxed condition of the seal prior to assembly, shown in Fig. 1, spring 27 serves to urge the members in opposite directions and the inwardly spun shoulder 23 on sleeve portion 22 engages flange 16 of the inner casing element and acts as a stop preventing end separation of the parts.

On its exposed outer face, the flange 21 of element 20 carries an annular, axially projecting face sealing nose 28, this being secured to the flange by bonding in a well known manner, which nose engages a flat sealing surface 29, in the operative, installed condition of the seal shown in Fig. 2. As illustrated, said surface is machined on one end wall of a counterbore 30 in the housing 11 which receives the seal.

In the installation illustrated, the seal is fixedly carried on shaft 10 and relative rotation of the inner and outer parts thereof is restrained by the tongue and slot provisions specially illustrated in Figs. 1 and 3. The axially extending sleeve portion 15 of inner casing element is slitted at 31 to enable an integral tongue 32 to be struck radially outwardly thereof, this tongue being receivable in a slot 33 cut in the radial flange 21 of the outer casing element 20. This relieves flexible diaphragm 18 of torque stress in the operation of the seal.

Flexible diaphragm 18 will accommodate considerable relative axial movement of the parts of the seal in operation, and, being located on the rear side of the seal which is exposed to dirt and the like, maintains the interior of the seal absolutely free from possible accumulation of dirt, foreign matter, etc., even when the flange 16 and stop shoulder 23 are separated, as they normally are when the seal is installed. Sealing nose 28 provides a comparably efficient, running fluid seal at the opposite side of the assembly.

Those skilled in the art will perceive that the structure shown and described is adaptable to various modifications and changes, hence I desire that the invention be construed in no more limited sense than is reasonably indicated by the scope of the appended claims.

I claim:

1. A seal comprising inner and outer casing members of L-shaped cross section, each including an axial sleeve and a radial flange of substantial width integral therewith in a plane normal thereto, said casing members being disposed in concentric, axially telescoped relation, with said sleeves in radially spaced, axially overlapping relation and said flanges in axially spaced, radially overlapping relation whereby to define an internal annular chamber of box-like section, an expanding spring in said chamber in axial thrust engagement with the respective flanges to urge said members in opposite axial directions, an annular flexible diaphragm, means securing said diaphragm to said casing members at the opposite peripheries thereof, said diaphragm being disposed generally parallel to and externally of one of said flanges and externally of said chamber, the other flange having an annular sealing member on the external surface thereof opposite said diaphragm, and means limiting relative axial movement of said members under the expanding action of said spring, including an annular shoulder on one of said members engageable with the flange of the other and coacting with its associated casing member as part of said securing means to clamp one margin of said diaphragm, the other casing also including an annular shoulder coacting therewith as another part of said securing means to clamp another margin of the diaphragm.

2. A seal comprising inner and outer casing members of L-shaped cross section, each including an axial sleeve and a radial flange of substantial width integral therewith in a plane normal thereto, said casing members being disposed in concentric, axially telescoped relation, with said sleeves in radially spaced, axially overlapping relation and said flanges in axially spaced, radially overlapping relation whereby to define an internal annular chamber of box-like section, an expanding spring in said chamber in axial thrust engagement with the respective flanges to urge said members in opposite axial directions, an annular flexible diaphragm, means securing said diaphragm to said casing members at the opposite peripheries thereof, said diaphragm being disposed generally parallel to and externally of one of said flanges and externally of said chamber, the other flange having an annular sealing member on the external surface thereof opposite said diaphragm, means limiting relative axial movement of said members under the expanding action of said spring, including an annular shoulder on one of said members engageable with the flange of the other and coacting with its associated casing member as part of said securing means to clamp one margin of said diaphragm, the other casing also including an annular shoulder coacting therewith as another part of said securing means to clamp another margin of the diaphragm, and means restricting relative rotation of the casing members comprising a radial tongue integral with the sleeve of one thereof having rotatively locking engagement with the flange of the other.

STUART E. ULLMANN.

REFERENCES CITED

The following references are of record in the file of this patent:

UNITED STATES PATENTS

| Number | Name | Date |
|---|---|---|
| 2,233,624 | Magnesen | Mar. 4, 1941 |
| 2,311,494 | Vedovell | Feb. 16, 1943 |
| 2,377,452 | Reynolds | June 5, 1945 |
| 2,395,359 | Vedovell | Feb. 19, 1946 |
| 2,462,067 | Buckendale | Feb. 22, 1949 |